United States Patent
Toyama et al.

(10) Patent No.: US 12,164,061 B2
(45) Date of Patent: Dec. 10, 2024

(54) LIDAR DEVICE

(71) Applicant: DENSO CORPORATION, Kariya (JP)

(72) Inventors: Kohei Toyama, Kariya (JP); Rentaro Akimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 889 days.

(21) Appl. No.: 16/936,387

(22) Filed: Jul. 22, 2020

(65) Prior Publication Data

US 2020/0348400 A1 Nov. 5, 2020

Related U.S. Application Data

(63) Continuation of application No. PCT/JP2019/001879, filed on Jan. 22, 2019.

(30) Foreign Application Priority Data

Jan. 24, 2018 (JP) .................................. 2018-009656

(51) Int. Cl.
*G01S 7/481* (2006.01)
*G02B 26/10* (2006.01)

(52) U.S. Cl.
CPC .......... *G01S 7/4817* (2013.01); *G02B 26/105* (2013.01)

(58) Field of Classification Search
CPC ............................ G01S 7/4817; G02B 26/105
See application file for complete search history.

(56) References Cited

U.S. PATENT DOCUMENTS

| | | | | |
|---|---|---|---|---|
| 5,253,033 A | * | 10/1993 | Lipchak | G01S 7/499 349/1 |
| 5,793,491 A | * | 8/1998 | Wangler | G01S 17/89 356/613 |
| 5,864,391 A | * | 1/1999 | Hosokawa | G01S 17/04 356/5.01 |
| 6,317,202 B1 | * | 11/2001 | Hosokawa | G01S 17/42 180/169 |
| 8,773,644 B2 | * | 7/2014 | Suzuki | G02B 26/12 356/9 |

(Continued)

FOREIGN PATENT DOCUMENTS

| | | |
|---|---|---|
| JP | H07-092270 | 4/1995 |
| JP | 2789741 B2 * | 8/1998 |

(Continued)

*Primary Examiner* — Luke D Ratcliffe
(74) *Attorney, Agent, or Firm* — MASCHOFF BRENNAN (57) ABSTRACT

A scanner has a rotational shaft and at least one reflection surface. The scanner rotates the at least one reflection surface together with the rotational shaft to thereby (i) change a direction of the light beam transmitted from the phototransmitter and incident on the scanner to output a changed light beam in a main scanning direction that is orthogonal to an axial direction of the rotational shaft, and (ii) reflect an arrival light beam arriving from a scanning region to thereby output the light beam to a direction in which the light beam is incident on the scanner. A photoreceiver receives the arrival light beam reflected by the scanner. The photoreceiver includes a received-light deflection mirror that deflects the arrival light beam outputted from the scanner in a second direction different from the first direction, and a light receiving device that receives the arrival light beam deflected by the received-light deflection mirror.

8 Claims, 9 Drawing Sheets

(56) References Cited

U.S. PATENT DOCUMENTS

| | | | | |
|---|---|---|---|---|
| 9,239,959 | B1* | 1/2016 | Evans | G01S 17/89 |
| 9,970,955 | B1* | 5/2018 | Homyk | A61B 5/0261 |
| 9,981,604 | B2* | 5/2018 | Sakai | B60Q 9/008 |
| 10,078,132 | B2* | 9/2018 | Ishikawa | G01S 7/4817 |
| 10,788,572 | B2* | 9/2020 | Hartmann | G01S 17/42 |
| 2012/0249996 | A1* | 10/2012 | Tanaka | G01S 17/42 |
| | | | | 356/4.01 |
| 2013/0229645 | A1* | 9/2013 | Suzuki | G01S 17/02 |
| | | | | 356/5.01 |
| 2015/0062555 | A1* | 3/2015 | Kim | G01S 17/87 |
| | | | | 356/4.01 |
| 2016/0341957 | A1* | 11/2016 | Kano | G01S 17/06 |
| 2020/0150243 | A1* | 5/2020 | Di Chele | G01S 7/4817 |

FOREIGN PATENT DOCUMENTS

| | | |
|---|---|---|
| JP | 2012-117996 A | 6/2012 |
| JP | 2016-205825 A | 12/2016 |

\* cited by examiner

FIG. 9

US 12,164,061 B2

LIDAR DEVICE

CROSS REFERENCE TO RELATED APPLICATION

The present application claims the benefit of priority from Japanese Patent Application No. 2018-009656 filed on Jan. 24, 2018, the entire disclosure of which is incorporated herein by reference.

TECHNICAL FIELD

The present disclosure relates to a lidar device including a light deflector.

BACKGROUND

Lidar devices may include a deflection mirror used as a light deflection device which is rotated to deflect light for scanning. The term "lidar" is also written as "LIDAR", which is an acronym for Light Detection and Ranging.

SUMMARY

An exemplary aspect of the present disclosure provides a lidar device including a phototransmitter, a scanner, and a photoreceiver. The phototransmitter includes at least one light source configured to transmit a light beam in a first direction.

The photoreceiver includes a received-light deflection mirror configured to deflect an arrival light beam outputted from the scanner in a second direction different from the first direction, and a light receiving device configured to receive the arrival light beam deflected by the received-light deflection mirror.

BRIEF DESCRIPTION OF THE DRAWINGS

The object described above, other objects, features, and advantages of the present disclosure will become apparent from the following description of embodiments with reference to the accompanying drawings in which.

DESCRIPTION OF EMBODIMENTS

Viewpoint

JP H07-92270 discloses a device including a light emission board, a light reception board, and a deflection mirror, with the boards arranged in the same direction as viewed from the deflection mirror. The light emission board has a light source mounted thereon for generating light that enters the deflection mirror. The light reflection board has a light receiving element mounted thereon for receiving, via the deflection mirror, light reflected from a target.

However, the disclosing persons have discovered the following problems with the conventional technique disclosed in the published patent document.

In the conventional device, the light emission board and light reception board have the light source and light receiving element respectively mounted on their major surfaces, and are located close to each other such that these surfaces partially overlap each other in order to reduce the size of the device. This structure makes the boards susceptible to electrical noise generated from them, and increases the size of the device in the direction in which the light emission and reception boards overlap.

One aspect of the present disclosure provides lidar devices, each of which has a smaller size and suffers from less electrical noise.

A lidar device according to an exemplary aspect of the present disclosure includes a phototransmitter, a scanner, and a photoreceiver. The phototransmitter includes at least one light source configured to transmit a light beam in a first direction. The at least one light source can include one or more optical devices, such as lenses or mirrors.

The scanner has a rotational shaft and at least one reflection surface, the scanner being configured to rotate the at least one reflection surface together with the rotational shaft to thereby 1. Change a direction of the light beam transmitted from the phototransmitter and incident on the scanner to output a changed light beam in a main scanning direction that is orthogonal to an axial direction of the rotational shaft
2. Reflect an arrival light beam arriving from a scanning region to thereby output the light beam to a direction in which the light beam is incident on the scanner.

The photoreceiver is configured to receive the arrival light beam reflected by the scanner.

The photoreceiver includes (i) a received-light deflection mirror configured to deflect the arrival light beam outputted from the scanner in a second direction different from the first direction, and (ii) a light receiving device configured to receive the arrival light beam deflected by the received-light deflection mirror.

This configuration of the lidar device enables the transmission direction of the light beam from the at least one light source to be different from the arrival light beam incident on the light receiving device. This leaves little room for arranging a light emission board on which the at least one light source is mounted and a light reception board on which the light receiving device is mounted such that their mount surfaces are parallelly overlapped with each other.

The lidar device therefore suffers from less electrical noise generated between the boards, and prevents an increase in size of the lidar device in an overlap direction of the boards.

Embodiments

An embodiment of the present disclosure will now be described with respect to the drawings.

1. Configuration

Figure 1:
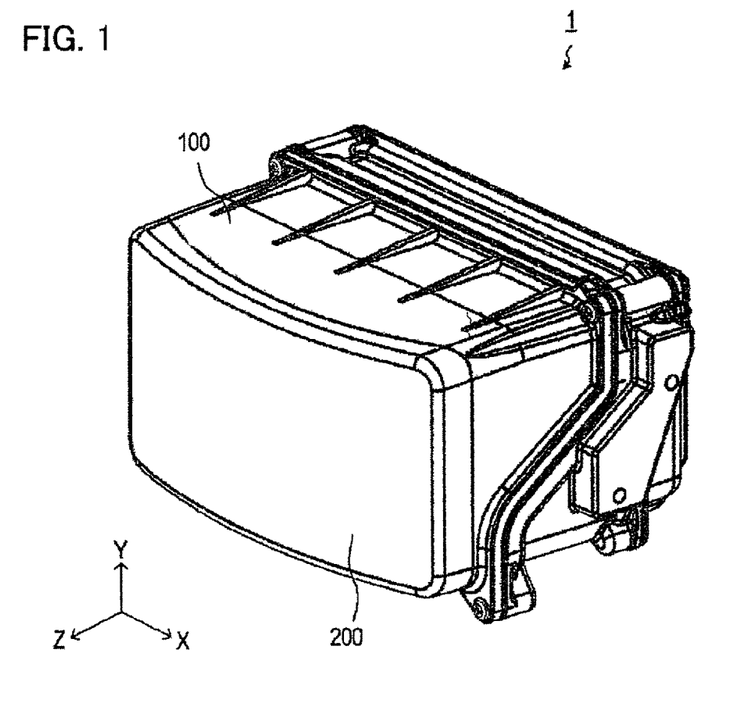
FIG. 1 is a perspective view of a lidar device.
Figure 2:
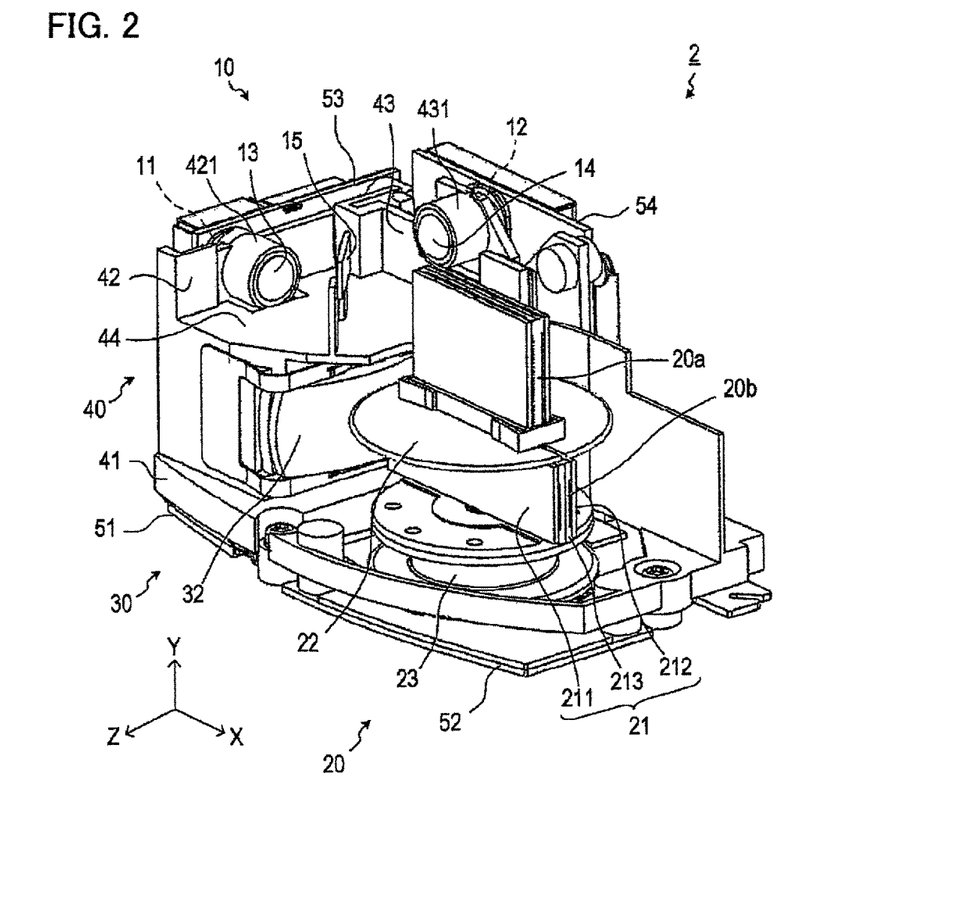
FIG. 2 is a perspective view of the lidar device, illustrating the structure of a light detection module disposed in a housing of the device.

FIG. 1 illustrates a lidar device 1 according to the present embodiment. The lidar device 1 is mounted on a vehicle, and is used, for example, to detect various objects around the vehicle. The term "lidar" is also written as "LIDAR", which is an acronym for Light Detection and Ranging.

As illustrated in FIG. 1, the lidar device 1 includes a housing 100 and an optical window 200.

The housing 100 is a rectangular-parallelepiped resin casing. The casing has a substantially rectangular side which has an opening. The housing 100 has a light detection module 2 (described later) disposed therein.

The optical window 200 is a resin lid fixed to the housing 100 so as to close the opening thereof. The optical window 200 enables laser light transmitted from the light detection module 2 inside the housing 100 to pass therethrough.

In the following description, an X-axis direction is defined as extending along a longer side of the substantially rectangular opening of the housing 100; a Y-axis direction is defined as extending along a shorter side of the opening; and a Z-axis direction is defined as extending orthogonal to the X-Y plane.

Note that the X-axis direction has a left side and a right side when viewed from a point that faces the opening of the housing 100, and the Y-axis direction has an upper side and a lower side when viewed from a point that faces the opening of the housing 100. A side of the opening of the housing 100 is defined as a front side, and a side of the housing 100, which is opposite to the side of the opening, is defined as a rear side. The Z-axis direction has a front side and a rear side that respectively refer to the front side of the housing 100 and the rear side thereof.

As illustrated in FIGS. 2 to 5, the light detection module 2 includes a phototransmitter 10, a scanner 20, and a photoreceiver 30. The light detection module 2 is mounted to the housing 100 via a frame 40.

[1-1-1. Scanner]

The scanner 20 includes a mirror module 21, a partition plate 22, and a motor 23.

The mirror module 21 includes a pair of deflection mirrors 211 and 212, and a mirror frame 213.

Each of the deflection mirrors 211 and 212 is a flat plate member having a reflective surface that can reflect light. The mirror frame 213 includes a disk member 213a and a mount member 213b. The disk member 213a is shaped like a circular flat plate, and has a center portion fastened to a rotational shaft of the motor 23.

The mount member 213b, which is a plate-like shape, has both opposite major surfaces to which the deflection mirrors 211 and 212 are respectively fixed. The mount member 213b is disposed vertically on the disk member 213a.

Each of the first and second deflection mirrors 211 and 212 and the mount member 213b has a combined shape of two rectangles each having opposing longer sides. The length of the longer side of one of the two rectangles is different from the length of the longer side of the other thereof.

Specifically, the two rectangles, each of which has opposing shorter sides, are combined together such that their central axes, each of which is parallel with the shorter sides, are aligned with each other.

As described above, the first and second deflection mirrors 211 and 212 and the mount member 213b, each of which is shaped as the combination of the two rectangles, are integrated with each other to constitute a mirror assembly comprised of a narrower-width rectangular portion and a wider-width rectangular portion. The narrower-width rectangular portion has a narrower width in its longitudinal direction, and the wider-width rectangular portion has a wider width in its longitudinal direction.

The first and second deflection mirrors 211 and 212, which are combined with each other via the mirror frame 213, are located such that (i) the wider-width rectangular portion is lower than the narrower-width rectangular portion, and (ii) the central axis of the mirror assembly of the combined first and second deflection mirrors 211 and 212 is aligned with the center of the disk-like member 213a. Rotatably driving the motor 23 therefore allows the mirror assembly of the combined first and second deflection mirrors 211 and 212 to rotate about the rotating shaft of the motor 23.

That is, the mirror module 21 is configured to rotate around the central axis of the mirror frame 213. The reflective surfaces of the first and second deflection mirrors 211 and 212 are parallel to the rotational shaft of the motor 23 independently of the rotational position of the motor 23.

The partition plate 22 is a circular plate-like member whose diameter is the same as the length of the wider-width portion in the longitudinal direction thereof. The partition plate 22 is divided into two semicircular portions. The partitioning plate 22 is fastened to the mirror module 21 while the semi-circular portions 1. Sandwich the narrower-width rectangular portion of the mirror module 21 from both major sides of the narrower-width rectangular portion
2. Abut on shoulders of the wider-width rectangular portion of the mirror module 21

Each of the first and second deflection mirrors 211 and 212 is comprised of

1. An upper portion located above the partition plate 22 and constituting the narrower-width rectangular portion of the mirror assembly
2. A lower portion located below the partition plate 22 and constituting the wider-width rectangular portion of the mirror assembly The upper portion of each of the first and second deflection mirrors 211 and 212 will be referred to as a transmitted-light deflector 20a, and the lower portion of each of the first and second deflection mirrors 211 and 212 will be referred to as a received-light deflector 20b.

[1-1-2. Phototransmitter]

The phototransmitter 10 includes a pair of light sources 11 and 12. The phototransmitter 10 may also include a pair of optically transmission lenses 13 and 14 and a transmitted-light deflection mirror 15.

In the following description, the transmitted-light deflector 20a has opposing surfaces, and has, on each of the opposing surfaces, a reflection spot on which a light beam from each of the light sources 11 and 12 is incident. Each of the opposing surfaces of the transmitted-light deflector 20a is defined as a reference surface including the reflection spot and orthogonal to the rotational axis of the mirror module 21.

Each of the light sources 11 and 12 is a semiconductor laser.

The light source 11, which has light emission surfaces, is located away from the reflection spot in the left side of the X-axis direction, with their light emission surfaces facing the transmitted-light reflector 20a.

The light source 12, which has light emission surfaces, is located away from a deflection spot in the direction toward the rear side of the Z-axis direction, with their light emission surfaces facing toward the front side of the Z-axis direction; the deflection spot is located in a center region of a predetermined light-beam path between the reflection spot and the light source 11.

The light source 11 has a first vertical position in the vertical direction (i.e., the Y-axis direction), and the light source 12 has a second vertical position in the vertical direction, i.e. the Y-axis direction. The first vertical position of the light source 11 is arranged to be lower than the reference surfaces of the transmitted-light reflector 20a in the Y-axis direction, and the second vertical position of the light source 12 is arranged to be higher than the reference surfaces of the transmitted-light reflector 20a. That is, the first and second vertical positions of the respective light sources 11 and 12 are different from each other.

The light transmission lens 13 is arranged to face the light emission surfaces of the light source 11. Similarly, the light transmission lens 14 is arranged to face the light emission surfaces of the light source 12. The light sources 11 and 12 are located near the focal points of the light transmission lenses 13 and 14, respectively.

Figure 5:
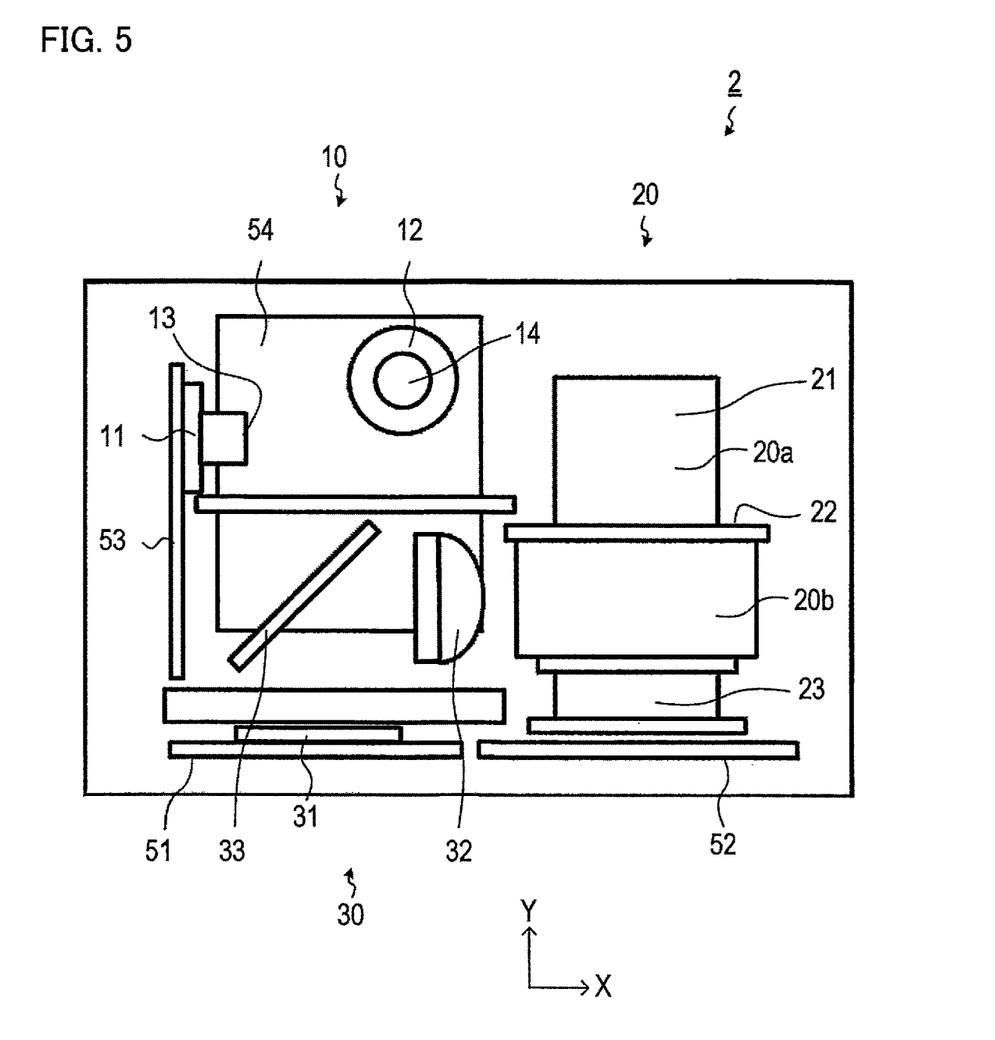
FIG. 5 is a schematic view schematically illustrating the arrangement of components of the lidar device.

The transmitted-light deflection mirror 15 is disposed at the deflection spots, and configured to deflect the light beams, which have transmitted from the light source 12 and passed through the light transmission lens 14, to thereby guide each of the deflected light beams to the corresponding reflection spot. In FIG. 5, the transmitted-light deflection mirror 15 is omitted.

Figure 6:
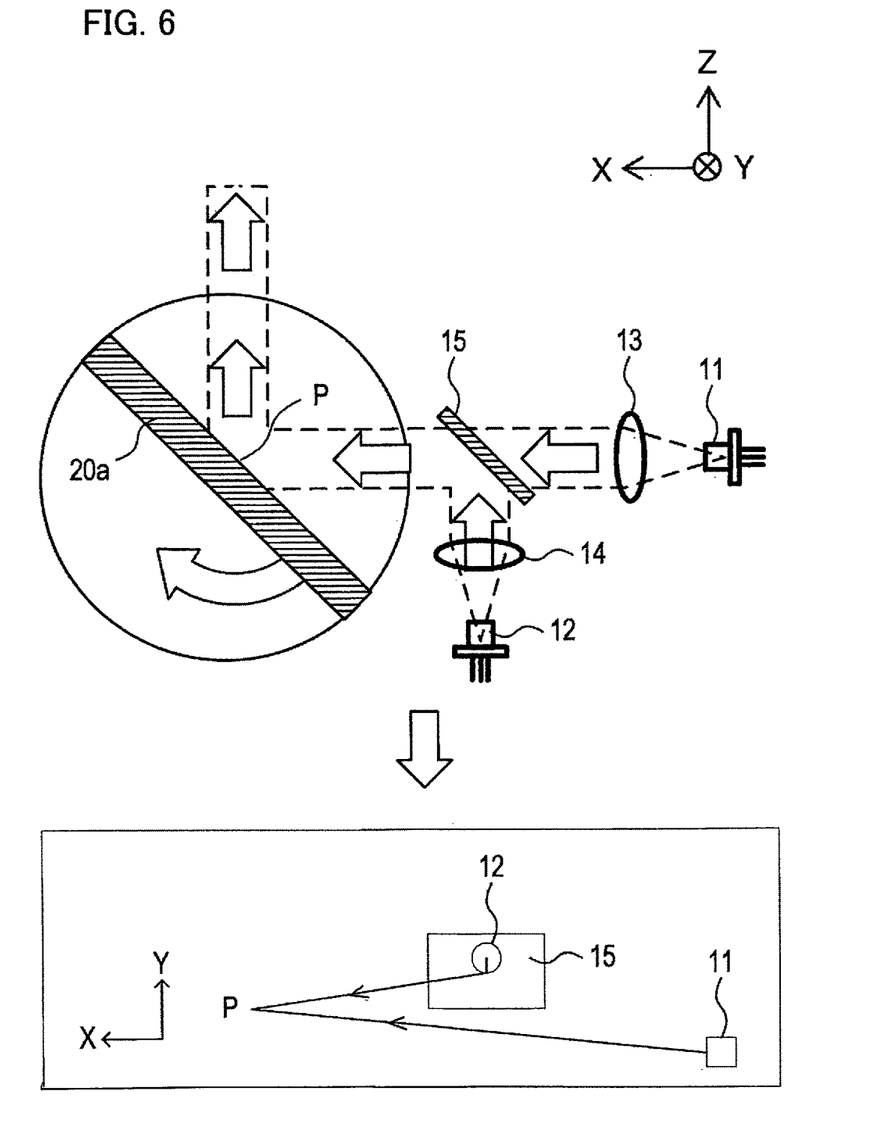
FIG. 6 is a diagram illustrating the path of a transmitted light beam and the arrangement of a transmitted-light deflection mirror relative to the path of light.

The transmitted-light deflection mirror 15, as illustrated in FIG. 6, is arranged above the path of each light beam transmitted from the light source 11, passed through the light transmission lens 13, and traveling toward the corresponding reflection spot. This arrangement of the transmitted-light deflection mirror 15 prevents the transmitted-light deflection mirror 15 from obstructing the path of each light beam. The path of each light beam from the light source 11 to the corresponding reflection spot has the same length as the path of each light beam from the light source 12 through the transmitted-light deflection mirror 15 to the corresponding reflection spot.

[1-1-3. Photoreceiver]

As illustrated in FIGS. 2 to 5, the photoreceiver 30 includes a light reception device 31. The photoreceiver 30 may also include a light reception lens 32 and a received-light deflection mirror 33.

Figure 3:
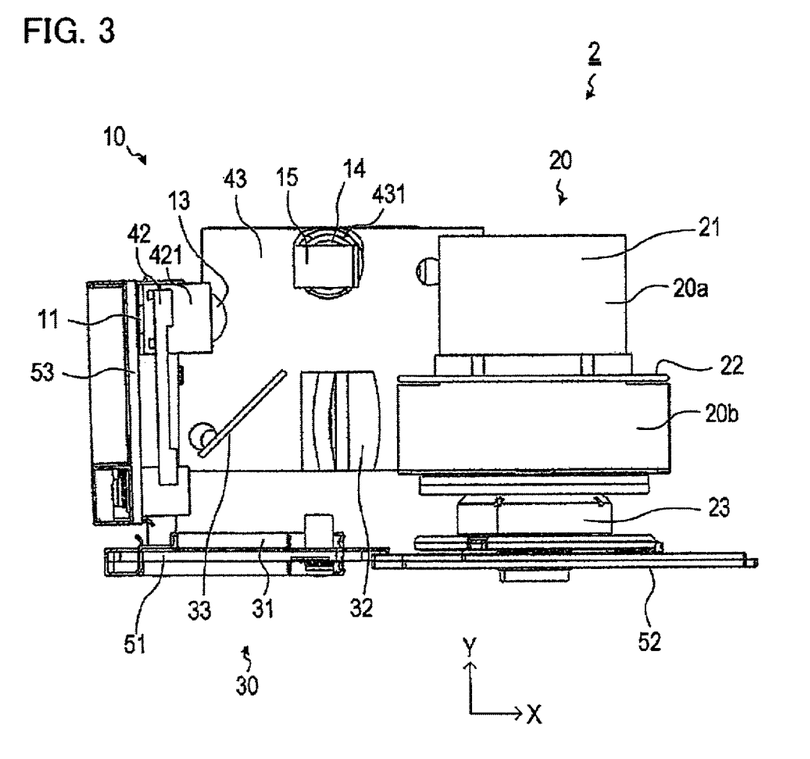
FIG. 3 is a front view of the light detection module having its components integrally installed in a frame partially illustrated.
Figure 4:
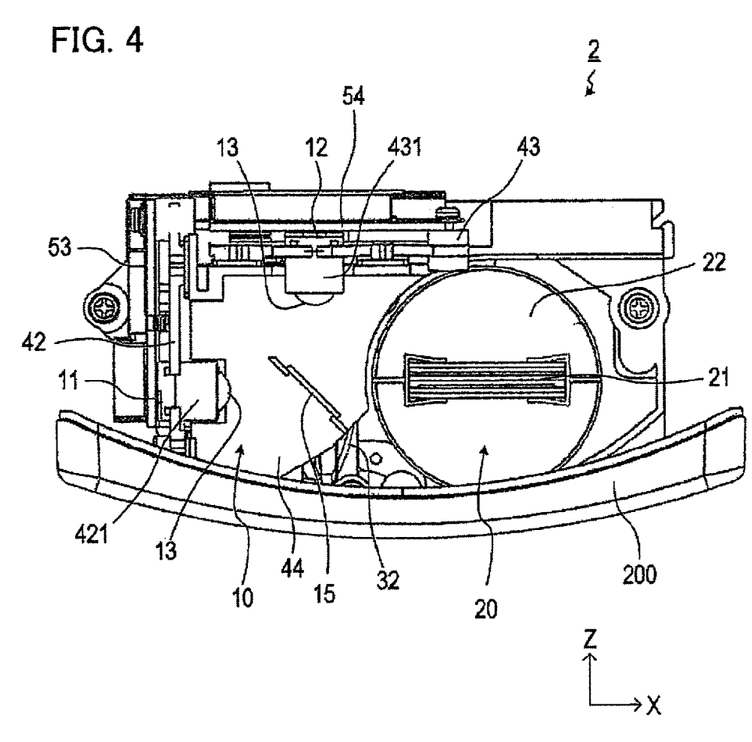
FIG. 4 is a plan view of the lidar device, with the housing omitted.
Figure 7:
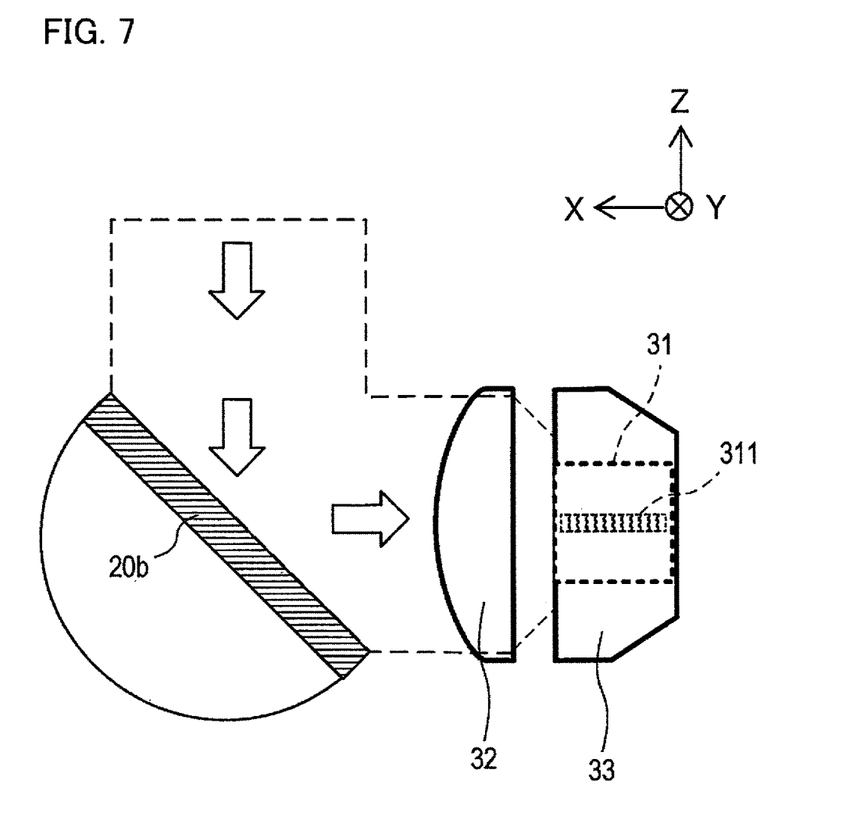
FIG. 7 is a diagram illustrating the path of a received light beam.

The light reception device 31 is located beneath the received-light deflection mirror 33. In FIGS. 3 to 5, part of the frame 40 is omitted to clearly illustrate the arrangement of the components of the photoreceiver 30. As shown in FIG. 7, the light reception device 31 includes an APD array 311 having a plurality of APDs arranged in a line. The "APD" refers to an avalanche photodiode. The light reception device 31 is arranged such that a light reception surface of each of the APDs faces upward along the Y-axis direction. The APDs of the APD array 311 are arranged in the X-axis direction.

The received light deflection mirror 33, as illustrated in FIGS. 2 to 5, is located on the left side of the X-axis direction relative to the received-light deflector 20b. The received-light deflection mirror 33 is arranged to deflect light beams, each of which is incident thereon through the photo reception lens 32, downward by a substantially right angle with respect to the Y-axis direction, thus causing a deflected light beam to reach the light reception device 31.

The light reception lens 32 is disposed between the received-light deflector 20b and the received-light deflection mirror 33. The received light lens 32 has a predetermined aperture that enables each light beam, which has passed through the aperture of the received light lens 32 so as to enter the light reception device 31, to have a reduced width in the Z-axis direction; the reduced width of the light beam in the Z-axis direction is on the order of the width of the APD in the Z-axis direction.

[1-1-4. Frame]

The frame 40 is configured to combine the components of the phototransmitter 10, scanner 20, and photoreceiver 30 together, and mount the combined components to the inside of the housing 100 while these components are fixedly arranged at predetermined respective positions in the housing 100.

As shown in FIGS. 2 to 5, the frame 40 includes a lower section 41, a side section 42, and a rear section 43 thereof. The frame 40 also includes a partition section 44.

A light reception board 51 has a mount surface on which the light reception device 30 is mounted, and a motor board 52 has a mount surface on which the motor 23 is mounted. The light reception board 51 and the motor board 52 are attached to a bottom of the frame lower section 41.

The frame lower section 41 has formed therethrough a first hole through which light from the received-light deflection mirror 33 to the light reception device 31 travels. The frame lower section 41 also has formed therethrough a second hole through which the motor 23 of the scanner 20 is disposed.

The mount surfaces of the light reception board 51 and motor board 52 where the light reception device 31 and the motor 23 are mounted are substantially coplanar.

The frame side section 42 has opposing front and rear surfaces, and is arranged such that the front surface faces the scanner 20. A cylindrical holder 421 projects from the front surface of the frame side section 42. The cylindrical holder 421 has a cylindrical opening with opposing front and rear ends, i.e. opposing right-side and left-side ends in the X-axis direction. The light transmission lens 13 is fitted in the front end of the cylindrical opening of the cylindrical holder 421.

A light emission board 53, to which the light source 11 has been assembled, is mounted to the rear surface of the frame side section 42. With the light emission board 53 mounted to the frame side section 42, the light source 11 is located at the rear end of the cylindrical opening of the cylindrical holder 421.

As with the frame side section 42, a cylindrical holder 431 projects from a front surface of the frame rear section 43. The cylindrical holder 431 has a cylindrical opening with opposing front and rear ends, i.e. opposing right-side and left-side ends in the X-axis direction. The light transmission lens 13 is fitted in the front end of the cylindrical opening of the cylindrical holder 431.

A light emission board 54, to which the light source 12 has been assembled, is mounted to the rear surface of the frame rear section 43. With the light emission board 5 mounted to the frame rear section 43, the light source 12 is located at the rear end of the cylindrical opening of the cylindrical holder 431.

The partition section 44 is provided at a predetermined position to place a partition between a space in which the components of the phototransmitter 10 are located and a space in which the components of the photoreceiver 30 are located. To the partition section 44, the transmitted-light reflection mirror 15, received-light deflection mirror 33, and light reception lens 32 are assembled thereto.

The light reception board 51 and the pair of light transmission boards 53 and 54 are mounted to the frame 40 with screws. That is, adjusting at least one of the location and angle of the light reception board 51 with screws allows at least one of the location and angle of the light reception device 31 to be finely adjusted three-dimensionally. Similarly, adjusting at least one of the location and angle of each of the light emission boards 53 and 54 allows at least one of the location and angle of the corresponding one of the light sources 11 and 12 to be finely adjusted three-dimensionally.

The holder 421 is integrated with the frame side section 4, but may be integrated with the light emission board 53. The holder 431 is integrated with the frame rear section 43, but may be integrated with the light emission board 54.

1-2. Operation

As illustrated in FIG. 6, each light beam transmitted from the light source 11 passes through the light transmission lens 13 and thereafter reaches the corresponding reflection spot on one of the reflection surfaces of the transmitted-light deflector 20a. Additionally, each light beam transmitted from the light source 12 passes through the light transmission lens 14 and is deflected by the transmitted-light deflection mirror 15 at a substantially right angle. The light beam deflected by the mirror 15a thereafter travels to enter the corresponding reflection spot on the other of the reflection surfaces of the transmitted-light deflection unit 20a.

The light beams incident on the transmitted-light deflection unit 20a are each transmitted in a corresponding direction determined by the rotational position of the mirror module 21. This enables the light beams to be scanned in a predetermined scanning region based on rotation of the mirror module 21.

As illustrated in FIG. 7, reflected light beams from a detection target located in a predetermined direction dependent on the rotational position of the mirror module 21 arrive at the received-light detection unit 20b as arrival light beams. The arrival light beams are each reflected by the received-light deflection unit 20b so as to be deflected thereby. The deflected light beams are thereafter received by the light reception device 31 via the light reception lens 32 and the received-light deflection mirror 33. The predetermined direction dependent on the rotational position of the mirror module 21 refers to a direction of a light beam emitted from the transmitted-light deflection unit 20a. The target object is a selected one of various objects to be detected by the lidar device 1.

That is, the lidar device 1 is configured to rotate the mirror module 21 to thereby mechanically perform the horizontal scanning, i.e. the main scanning, of the laser beams.

In addition, the lidar device 1 is configured to control the light sources 11 and 12 that transmit the four light beams aligned in the vertical direction while controlling the APD array 31, thus electronically performing the vertical scanning, i.e. the sub scanning, of the laser beams.

1-3. Advantageous Effects

The lidar device 1 described in detail above achieves the following advantages effects.

(1a) The lidar device 1 has the phototransmitter 10 and the photoreceiver 30 arranged in the same direction as viewed from the scanner 20 (i.e., the left side in the X-axis direction in FIGS. 2 to 5). The lidar device 1 is configured to deflect the light beams from the light source 12 using the transmitted-light deflection mirror 15, and deflect arrival light beams from a target object using the received-light deflection mirror 33. This configuration enables the transmission direction of each light beam from the light sources 11 and 12 to be substantially orthogonal to the reception direction of each arrival light beam incident on the light reception device 31.

The lidar device 1, which has this configuration, has therefore the light emission boards 53 and 54 and the light reception board 51 arranged with the mount surfaces of the light emission boards 53 and 54 being perpendicular to the mount surface of the light reception board 51.

The mount surface of each of the light emission boards 53 and 54 refers to a surface of the corresponding one of the light emission boards 53 and 54 on which the corresponding one of the light sources 11 and 12 is mounted. Additionally, the mount surface of the light reception board 51 refers to a surface of the light reception board 51 on which the light reception device 31 is mounted.

Consequently, the lidar device 1 suffers from less electrical noise generated between the boards compared with conventional devices in which a light emission board and a light reception board are arranged with their mount surfaces parallel to and overlapping each other.

(1b) The lidar device 1 includes the received-light deflection mirror 33 configured to deflect arrived light beams reflected by the scanner 20a downward in the Y-axis direction. This configuration enables the light reception board 51 and the motor board 52 to be arranged with their mount surfaces being substantially coplanar.

This therefore allows for the effective use of a space located in a lower part of the housing 100, which has the thickness of the motor 23 in the Y-axis direction (i.e., the length of the motor 23 in the Y-axis direction; this space is conventionally a dead space. This effective use of the space located in the lower part of the housing also allows the lidar device 1 to have a smaller size.

In addition, the arrangement of the light reception board 51 and the motor board 52 simplifies the shape of the lower section 41 of the frame 41 to which the light reception board 51 and the motor board 52 are mounted, thereby reducing both the workload of manufacture of the frame 40 and the workload of mounting the light reception board 51 and the motor board 52 to the frame 40.

2. Modifications

The present disclosure is not limited to the embodiment described above, and may be modified in various forms.

(2a) In the above embodiment, the phototransmitter 10 of the light detection module 2 includes the two light transmission boards 53 and 54. The phototransmitter 10 may include only one of the light transmission boards 53 and 54. In this modification, the two light sources 11 and 12 may be mounted to one light emission board.

Figure 8:
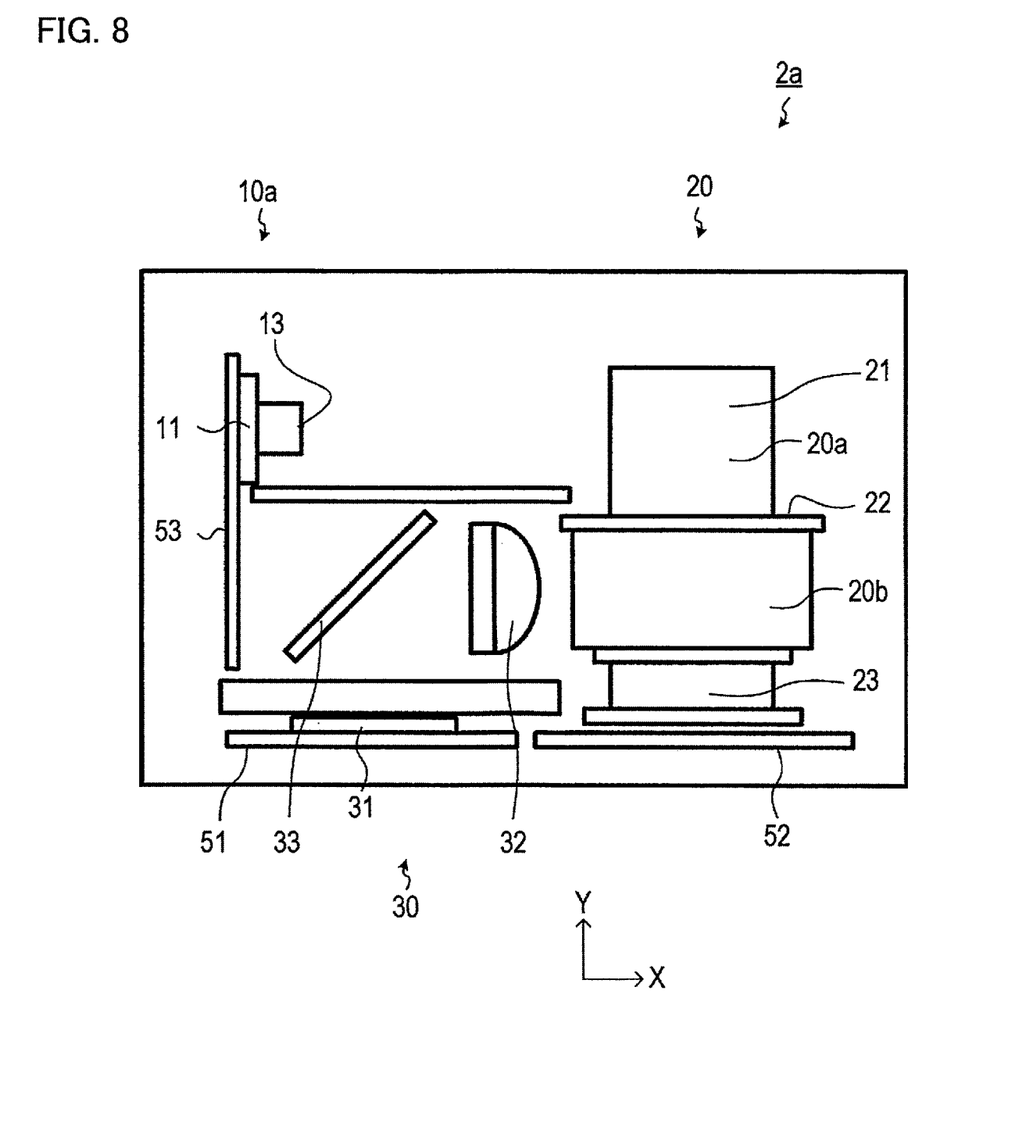
FIG. 8 is a schematic view schematically illustrating the arrangement of components of a first modification of the light detection module.

If the light emission board 54 is omitted as with a phototransmitter 10a of a light detection module 2a shown in FIG. 8, the lidar device 1 decreases in size in the rear direction (i.e., the Z-axis direction), and enables the transmitted-light reflection mirror 15 to be eliminated.

Figure 9:
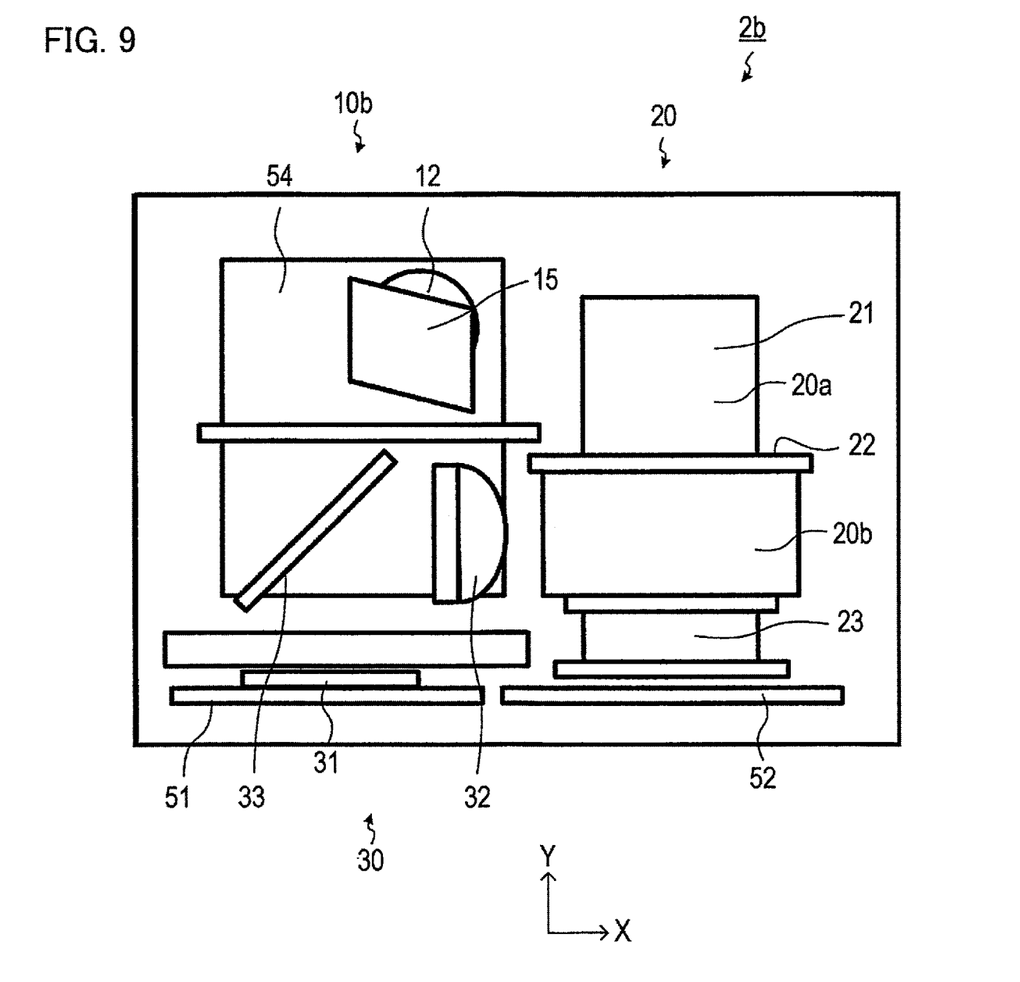
FIG. 9 is a schematic view schematically illustrating the arrangement of components of a second modification of the light detection module.

If the light emission board 53 is omitted as with the phototransmitter 10b of a light detection module 2b shown in FIG. 9, the lidar device 1 decreases in size in the width direction (i.e., the X-axis direction).

(2b) A plurality of functions of one component in the above embodiment may be implemented by a plurality of components, and one function of one component may be implemented by a plurality of components. A plurality of components of a plurality of components may be implemented by one component, and one function implemented by a plurality of components may be implemented by one component. Part of the configuration in the above embodiment may be eliminated. Part of the configuration of the above embodiment may be added to or replaced with part of a configuration of at least one of the modifications.

(2c) In addition to the lidar device 1 described above, the present disclosure may be implemented in various forms, such as a system including the lidar device 1 as a component.

What is claimed is:

1. A lidar device comprising:
    a phototransmitter including at least one light source configured to transmit a light beam in a first direction;
    a scanner that has a rotational shaft and at least one reflection surface, the scanner being configured to rotate the at least one reflection surface together with the rotational shaft to thereby:
        change a direction of the light beam transmitted from the phototransmitter and incident on the scanner to output a changed light beam in a main scanning direction that is orthogonal to an axial direction of the rotational shaft; and
        reflect an arrival light beam arriving from a scanning region to thereby output the light beam to a direction opposite to an incident direction in which the light beam is incident on the scanner; and
    a photoreceiver configured to receive the arrival light beam reflected by the scanner,
    wherein:
    the photoreceiver includes:
        a received-light deflection mirror configured to deflect the arrival light beam outputted from the scanner in a second direction different from the first direction; and
        a light receiving device configured to receive the arrival light beam deflected by the received-light deflection mirror;
    the scanner includes:
        a mirror module having the at least one reflective surface;
        a motor mounted on the rotational shaft; and
        a partition plate;
    the mirror module includes a transmitted-light deflector and a received-light deflector in the axial direction of the rotational shaft, the transmitted-light deflector being located to be farther from the motor than the received-light deflector;
    the transmitted-light deflector is configured to change an output direction of the light beam that is incident thereon from the phototransmitter;
    the received-light deflector is configured to output the arrival light beam toward the received-light deflection mirror;
    the partition plate is arranged to separate the transmitted-light deflector and the received-light deflector from one another in the axial direction of the rotational shaft; and
    the phototransmitter, the received-light deflection mirror, and the light receiving device are substantially aligned with each other, a direction of alignment of the phototransmitter, the received-light deflection mirror, and the light receiving device being substantially parallel to the rotational shaft.

2. The lidar device according to claim 1, wherein the second direction is parallel to a direction in which a length of the motor extends.

3. The lidar device according to claim 1, wherein:
    the rotational shaft has opposing first and second ends in the axial direction thereof;
    the motor is located on the rotational shaft to be closer to the first end than to the second end; and
    the received-light deflection mirror is configured to deflect the arrival light beam toward a side of the first end in a predetermined direction parallel to the axial direction.

4. The lidar device according to claim 1 wherein:
    the phototransmitter comprises a light emission board having a mount surface on which the light source is mounted;
    the photoreceiver comprises a light reception board having a mount surface on which the light receiving device is mounted; and
    the light emission board and the light reception board are arranged such that the mount surface of the light emission board and the mount surface of the light reception board are perpendicular to each other.

5. The lidar device according to claim 1, wherein:
    the photoreceiver comprises a light reception board having a mount surface on which the light receiving device is mounted;
    the scanner comprises a motor board having a mount surface on such that the motor mounted on the rotational shaft is mounted; and
    the light reception board and the motor board are arranged while the mount surface of the light reception board and the mount surface of the motor board are substantially coplanar.

6. A lidar device comprising:
    a phototransmitter including at least one light source configured to transmit a light beam in a first direction;
    a scanner that has a rotational shaft and at least one reflection surface, the scanner being configured to rotate the at least one reflection surface together with the rotational shaft to thereby:
        change a direction of the light beam transmitted from the phototransmitter and incident on the scanner to output a changed light beam in a main scanning direction that is orthogonal to an axial direction of the rotational shaft; and
        reflect an arrival light beam arriving from a scanning region to thereby output the light beam to a direction opposite to an incident direction in which the light beam is incident on the scanner; and
    a photoreceiver configured to receive the arrival light beam reflected by the scanner,
    wherein:
    the photoreceiver includes:
        a received-light deflection mirror configured to deflect the arrival light beam outputted from the scanner in a second direction different from the first direction; and a light receiving device configured to receive the arrival light beam deflected by the received-light deflection mirror;

the scanner includes:
- a mirror module having the at least one reflective surface; and
- a motor mounted on the rotational shaft;

the mirror module includes a transmitted-light deflector and a received-light deflector in the axial direction of the rotational shaft, the transmitted-light deflector being located to be farther from the motor than the received-light deflector;

the transmitted-light deflector is configured to change an output direction of the light beam that is incident thereon from the phototransmitter;

the received-light deflector is configured to output the arrival light beam toward the received-light deflection mirror;

the rotational shaft has opposing first and second ends in the axial direction thereof;

the motor is located on the rotational shaft to be closer to the first end than to the second end;

the received-light deflection mirror is configured to deflect the arrival light beam toward a side of the first end in a predetermined direction parallel to the axial direction;

the photoreceiver comprises a light reception board having a mount surface on which the light receiving device is mounted;

the scanner comprises a motor board having a mount surface on such that the motor mounted on the rotational shaft is mounted;

the light reception board and the motor board are arranged while the mount surface of the light reception board and the mount surface of the motor board are substantially coplanar; and each of the transmitted-light deflector and the received-light deflector has a width in a direction perpendicular to the axial direction of the rotational shaft, the width of the received-light deflector being wider than the width of the transmitted-light deflector.

7. The lidar device according to claim 6, wherein:

the phototransmitter comprises a light emission board having a mount surface on which the light source is mounted;

the photoreceiver comprises a light reception board having a mount surface on which the light receiving device is mounted; and the light emission board and the light reception board are arranged such that the mount surface of the light emission board and the mount surface of the light reception board are perpendicular to each other.

8. The lidar device according to claim 6, wherein the second direction is parallel to a direction in which a length of the motor extends.

* * * * *